UNITED STATES PATENT OFFICE.

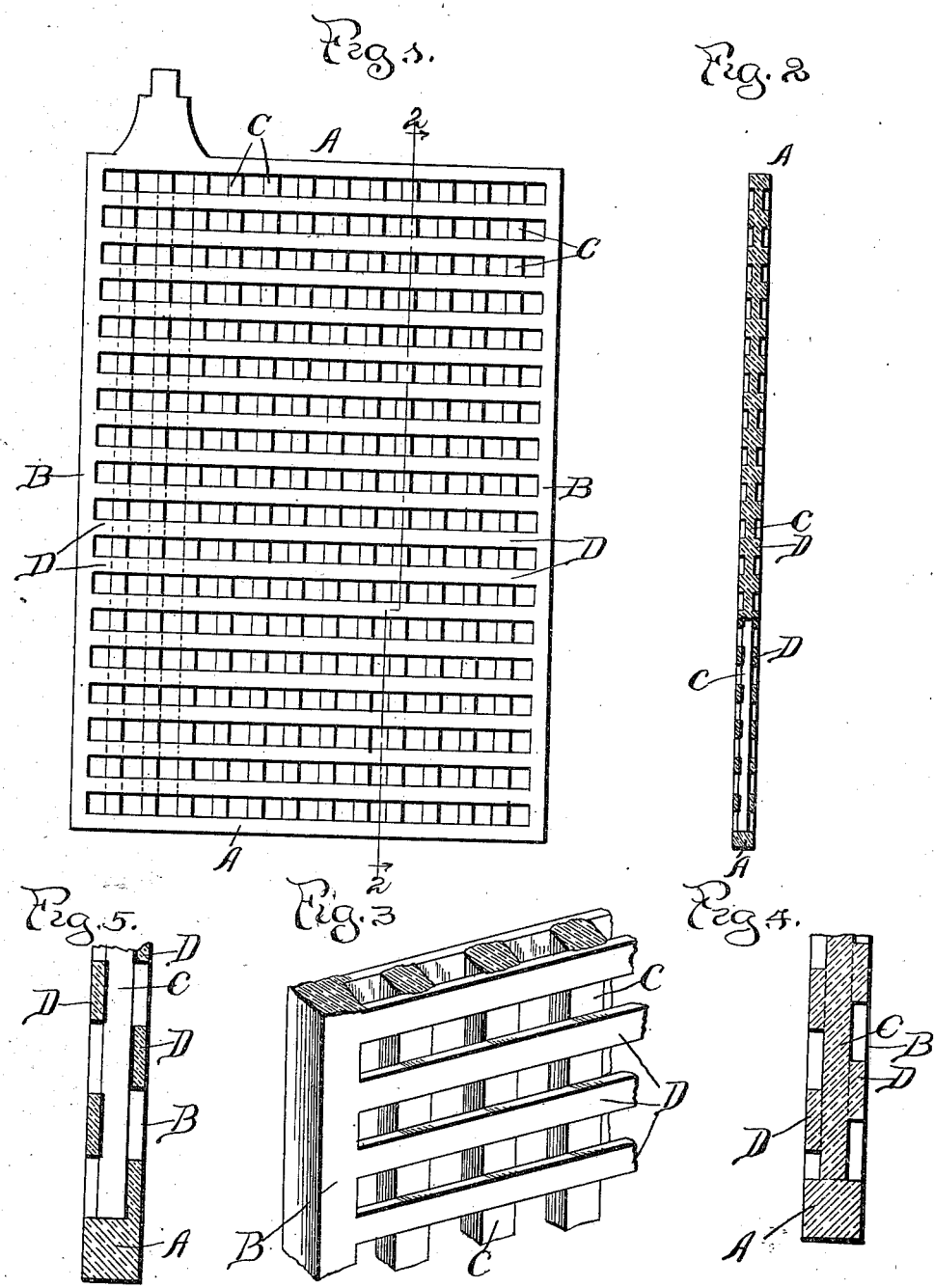

HENRY C. PORTER, OF CHICAGO, ILLINOIS, ASSIGNOR OF ONE-HALF TO THE OWEN H. FAY LIVERY COMPANY, OF SAME PLACE.

BATTERY PLATE OR GRID.

SPECIFICATION forming part of Letters Patent No. 669,487, dated March 5, 1901.

Application filed February 5, 1900. Serial No. 4,104. (No model.)

*To all whom it may concern:*

Be it known that I, HENRY C. PORTER, a citizen of the United States, residing at Chicago, in the county of Cook and State of Illinois, have invented certain new and useful Improvements in Battery Plates or Grids, of which the following is a specification.

This invention relates to improvements in battery plates or grids, and has for its primary objects the provision of means for locking the active material in place in the grid, while at the same time exposing the maximum surface thereof to the action of the electrolytic fluid without detracting from the strength of the grid. These and such other objects as may hereinafter appear are attained by the devices illustrated in the accompanying drawings, in which—

Figure 1 represents a side elevation of a plate or grid embodying my invention. Fig. 2 represents a vertical section thereof on the line 2 2 of Fig. 1. Fig. 3 represents a perspective view of a portion of the grid. Figs. 4 and 5 represent modifications of my invention.

Similar letters of reference indicate the same parts in the several figures of the drawings.

Referring by letter to the accompanying drawings, A indicates the end bars, and B the side bars, of a rectangular frame composed of a lead alloy, said bars being connected integrally by a series of longitudinal central posts C and transverse bars or ribs D, it being my purpose to cast all of said bars—that is, the side, end, longitudinal, and transverse bars—integrally and at one operation.

In practice I propose to have the longitudinal posts C double the thickness of the transverse bars D and located at the center of width of the end bars A with a view to giving great strength to the plate as against lateral flexure thereof in use. The transverse bars D, extending between the side bars B and flush therewith, being integrally connected with the longitudinal bars serve to form a series of pockets to receive the active material, which is usually applied to plates of this kind in the form of a paste, the active material lying not only between the transverse bars and over the longitudinal bars, but also between the longitudinal bars, so that while the maximum area of the active material is exposed to the action of the electrolytic fluid such material is securely locked in position upon the plate, in fact forming an integral mass throughout the plate.

In Fig. 3 I have shown the transverse bars D on opposite sides of the plate arranged in the same horizontal plane, while in Fig. 5 I have shown said transverse bars in staggered relation to each other, while in Fig. 4 they are shown as half-lapping.

Obviously other arrangements may be made and other proportions as between the longitudinal and transverse bars may be employed without departing from the spirit of my invention.

Having described my invention, what I claim, and desire to secure by Letters Patent, is—

1. A battery plate or grid comprising a rectangular frame, a series of centrally-disposed longitudinal bars integrally connecting the end bars of the frame, and a series of transverse bars integrally connecting the side bars of the frame and the longitudinal bars, at opposite sides of the central longitudinal bars, whereby spaces are formed between the inner faces of the transverse bars, substantially as and for the purpose described.

2. A battery plate or grid comprising a rectangular frame composed of bars, a series of longitudinal centrally-disposed bars, a series of transverse bars on each side of the longitudinal bars and connecting the side bars of the grid, said transverse and longitudinal bars being so arranged as to form openings between both sets of bars, substantially as and for the purpose described.

3. A battery plate or grid, comprising end bars, a rectangular frame, a series of centrally-disposed longitudinal bars connecting the end bars of the frame, and a series of transverse bars connecting the side bars of the frame, said transverse bars being located on the outer sides of the longitudinal bars whereby spaces are formed between the longitudinal bars for the reception of active material as well as between the transverse bars.

HENRY C. PORTER.

Witnesses:
C. L. WOOD,
F. H. DRURY.